H. E. LEVER.
DRIVING GEAR FOR MOTOR VEHICLES.
APPLICATION FILED JAN. 5, 1910.

992,967.

Patented May 23, 1911.

2 SHEETS—SHEET 1.

Witnesses:
Chas. Ovendale
F. Ovendale

Inventor:
Harry Edgar Lever

H. E. LEVER.
DRIVING GEAR FOR MOTOR VEHICLES.
APPLICATION FILED JAN. 5, 1910.

992,967.

Patented May 23, 1911.

2 SHEETS—SHEET 2.

Witnesses:
Chas. Ovendale
J. Ovendale

Inventor
Harry Edgar Lever

UNITED STATES PATENT OFFICE.

HARRY EDGAR LEVER, OF JOHANNESBURG, TRANSVAAL.

DRIVING-GEAR FOR MOTOR-VEHICLES.

992,967.  Specification of Letters Patent.  Patented May 23, 1911.

Application filed January 5, 1910. Serial No. 536,583.

*To all whom it may concern:*

Be it known that I, HARRY EDGAR LEVER, a subject of the King of Great Britain, and a resident of Johannesburg, Transvaal, have invented certain new and useful Improvements in Driving-Gear for Motor-Vehicles, of which the following is a specification.

This invention relates to driving gear for motor cars and other similar motor vehicles.

It has for its object to so construct the driving mechanism that all the gears or wheels run in mesh continually.

The gear is operated on the ordinary "gate" principle, so that two gears cannot be brought into action simultaneously.

I will describe my invention in detail by aid of the accompanying drawings, wherein—

Figure 1:
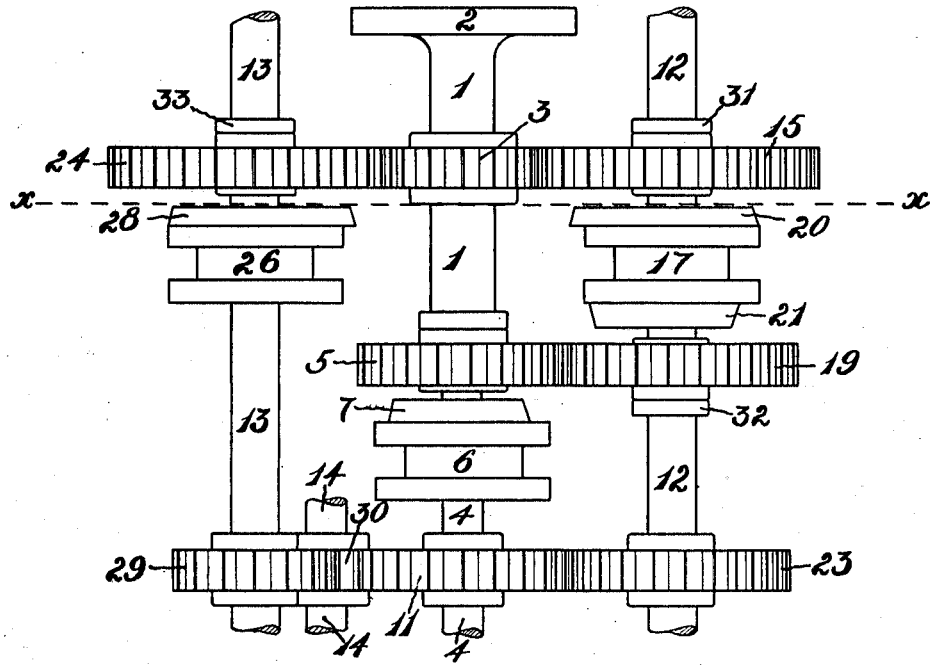
Figure 2:
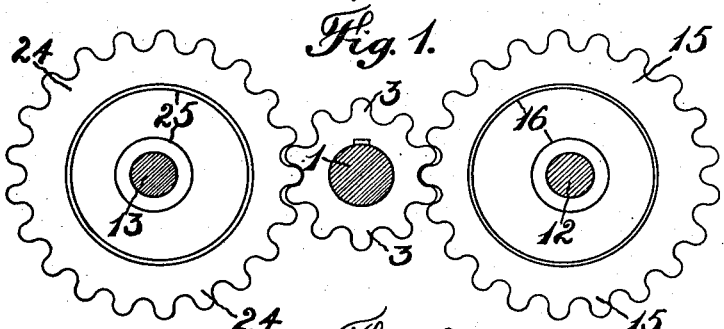
Figure 3:
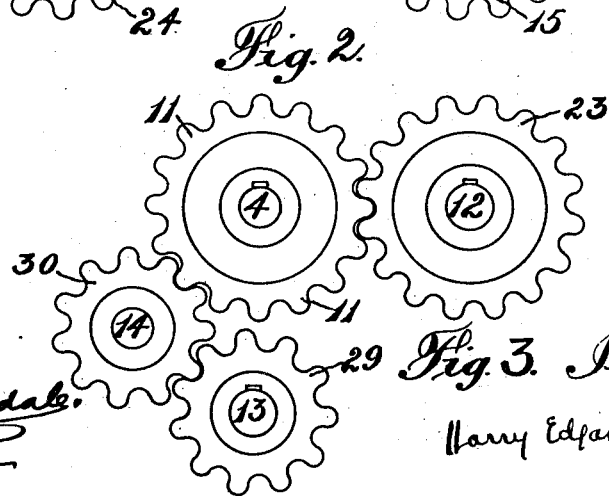
Figure 4:
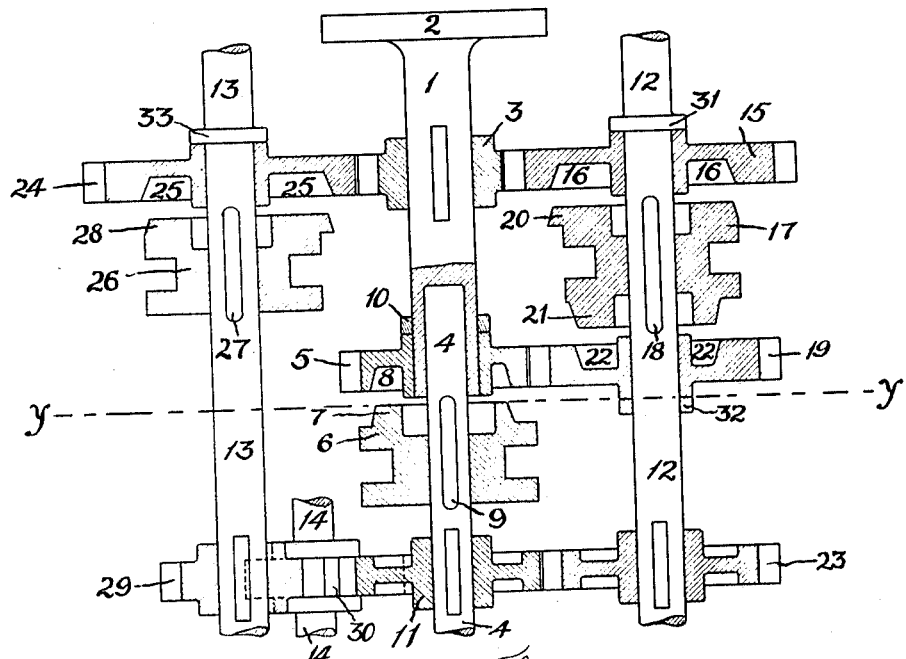
Figure 6:
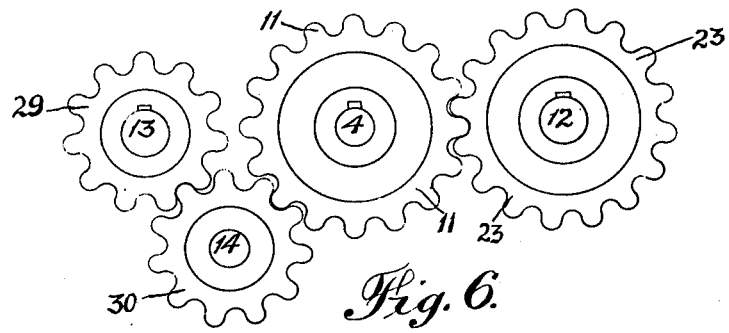
Figure 5:
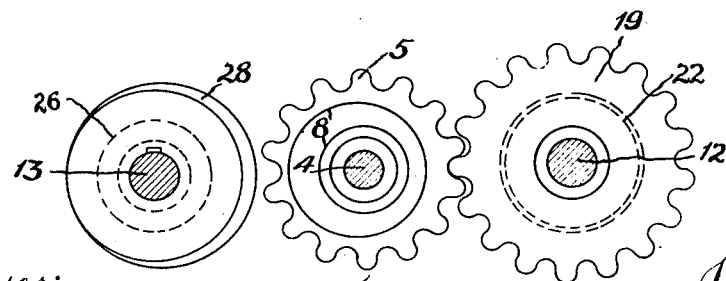

Figure 1 is a plan view of the driving gear. Fig. 2 is a section of Fig. 1 on line $x$—$x$. Fig. 3 is an end elevation of the gear showing the several shafts in the positions in which they will usually be arranged relative to each other. Fig. 4 is a horizontal section of the gear; Fig. 5 a section of Fig. 4 on line $y$—$y$; and Fig. 6 an end elevation of Fig. 4.

In the construction of my improved driving gear I employ a main transmitting shaft 1 which is adapted, at its outer end 2, to be coupled up with the engine or motor. On shaft 1 is keyed or otherwise suitably fixed a gear or toothed wheel 3. Axially alined with the main transmitting shaft 1 is a secondary transmitting shaft 4, one end of which, as shown, may be conveniently journaled in the end of said main transmitting shaft 1. On the inner end of the main transmitting shaft 1 is fixed a gear or toothed wheel 5; and on the secondary transmitting shaft 4 is arranged a movable clutch member 6 which, on the side facing wheel 5, is constructed with an eccentric projection or boss 7. In the side of the wheel 5 opposite clutch member 6, is formed a corresponding eccentric recess 8—see Figs. 4 and 5—with which eccentric projection or boss 7 is adapted to engage when clutch member 6 is slid longitudinally of shaft 4 toward wheel 5. Clutch member 6 may be actuated to cause projection 7 to engage recess 8 by means of a clutch lever (not shown) or its equivalent.

9 in Fig. 4 is a feather key for clutch member 6; and 10 a collar provided on shaft 1 for preventing movement of wheel 5 longitudinally of said shaft. When eccentric projection or boss 7 is caused to engage eccentric recess 8 and wheel 5, then secondary transmitting shaft 4 is rotated directly from the main transmitting shaft 1.

11 is a toothed wheel or gear fixed on the outer end of secondary transmitting shaft 4.

12, 13, 14 are three other shafts which are arranged parallel with the main and secondary transmitting shafts 1, 4 respectively.

On shaft 12 is loosely mounted a toothed wheel or gear 15 which meshes with gear or toothed wheel 3 on main transmitting shaft 1. Gear or toothed wheel 15 is constructed on the inside with a conical recess 16 which is eccentric to its shaft 12.

17 in Figs. 1 and 4 is a movable clutch member slidably mounted on a feather 18 in shaft 12. 19 is another gear or toothed wheel loosely mounted on shaft 12 at the other side of the movable clutch member 17. Wheel 19 meshes with the toothed wheel or gear 5. Clutch member 17 is constructed at each end with an eccentric conical boss or projection 20, 21 respectively; and wheel or gear 19, on the side facing the clutch member 17, is constructed with an eccentric recess 22 corresponding to eccentric boss or projection 21. Clutch member 17 is adapted to be moved on feather key 18 by means of a clutch lever or its equivalent to clutch either of wheels 15, 19 to shaft 12. Eccentric boss or projection 20 engages eccentric recess 16 in wheel 15, when clutch member 17 is moved in one direction; and eccentric boss 21 engages eccentric recess 22 in wheel 19 when the clutch member 17 is moved in the opposite direction.

23 is a further toothed wheel or gear keyed or otherwise suitably fixed on the inner end of shaft 12, which toothed wheel 23 meshes with toothed wheel 11 fixed on secondary transmitting shaft 4.

24 is a toothed wheel or gear loosely mounted on shaft 13, which meshes with toothed wheel or gear 3 on main transmitting shaft 1. Toothed wheel 24 on the inside is constructed with an eccentric recess 25.

26 is a clutch member slidably mounted on feather key 27 in shaft 13. Clutch member 26 is constructed on the side next the gear or toothed wheel 24 with an eccentric projection or boss 28 which is adapted to engage eccentric recess 25 in gear or toothed wheel 24 to clutch the latter to the shaft 13.

29 is another toothed wheel or gear keyed or otherwise suitably fixed on the inner end of shaft 13. Toothed wheel or gear 29 meshes with a toothed wheel or gear 30, which is loosely mounted upon idler shaft 14. Toothed wheel 30 on idler shaft 14 meshes with the toothed wheel 11 on secondary transmitting shaft 4.

31, 32 are thrust collars on shaft 12 for gears or toothed wheels 15, 19, respectively; and 33 is a similar collar on shaft 13 for gear or toothed wheel 24.

The manner of operating the driving gear is as follows:—The first speed is obtained by clutching to shaft 12 gear 15, which meshes with gear 3 fixed on main transmitting shaft 1. The motion of shaft 1 is then transmitted to secondary transmitting shaft 4 through the gears 23, 11, on shafts 12 and 4 respectively. The second speed is obtained by clutching to shaft 12 gear 19, which meshes with gear 5 fixed on the end of main transmitting shaft 1. Shaft 12 is then driven from shaft 1 through gears 5, 19, and the motion is then transmitted from shaft 12 to the secondary transmitting shaft 4 through gears 23, 11. For the top speed or direct drive, the clutch 6 on secondary transmitting shaft 4 is operated to clutch shaft 4 to the gear 5 on the end of main transmitting shaft 1, thereby connecting the main transmitting shaft 1 direct to the secondary transmitting shaft 4. The reverse or backward movement is effected by sliding clutch 26 on shaft 13 into gear 24 which meshes with gear 3 fixed to shaft 1. Shaft 13 is then driven from main transmitting shaft 1 through gears 3 24. The motion of shaft 13 is then transmitted to secondary transmitting shaft 4 through gear 29 on said shaft 13, gear 30 on idler shaft 14 and gear 11 fixed on secondary transmitting shaft 4.

What I claim as my invention and desire to protect by Letters Patent is:—

1. In a driving gear for motor vehicles, in combination, a main transmitting shaft (1) and a secondary transmitting shaft (4) axially alined with said main transmitting shaft (1), a gear (3) fixed to the main transmitting shaft (1), a further gear (5) fixed on said main transmitting shaft (1), the latter gear having a conical recess (8) eccentric to both shafts, a clutch member (6) slidably arranged on the secondary transmitting shaft (4), said clutch member having a conical projection or boss (7) eccentric to both shafts and adapted to clutch the secondary transmitting shaft (4) to the main transmitting shaft (1) through gear (5), a gear (11) fixed on the secondary transmitting shaft (4), three other shafts (12, 13, and 14) arranged parallel with the main and secondary transmitting shafts, a gear (15) loosely mounted on one of said shafts (12), said gear meshing with the gear (3) fixed to main transmitting shaft (1), a further gear (19) loosely mounted on shaft 12, said further gear meshing with the gear 5 on main transmitting shaft 1, the gears 15 and 19 having conical opposing recesses (16, 22) eccentric to shaft 12, a clutch member slidably arranged on shaft 12 between gears 15, 19, said clutch member (17) having conical projections or bosses (20, 21) eccentric to shaft 12 and adapted to clutch either of gears 15, 19, to shaft 12, a further gear (23) fixed on shaft 12, and meshing with the gear 11 on secondary transmitting shaft 4, a gear (24) loosely mounted on shaft 13, said gear (24) meshing with the gear 3 fixed on the main transmitting shaft (1), said gear (24) having a conical recess (25) eccentric to shaft 13, a clutch member (26) slidably arranged on shaft 13, said clutch member having a conical projection or boss 28 eccentric to shaft 13 and adapted to clutch said gear 24 to shaft 13, a further gear (29) fixed on shaft 13, a gear (30) on idler shaft 14, said gear 30 meshing with gear 29 on shaft 13 and gear 11 on secondary transmitting shaft 4, as set forth.

2. In a driving gear for motor vehicles, in combination, a main transmitting shaft 1 adapted to be coupled up with the engine or motor, a secondary transmitting shaft 4 axially alined with shaft 1, shaft 1 being constructed at its inner end to form a bearing for rotatably supporting shaft 4, a gear 3 fixed to shaft 1, a further gear 5 fixed on shaft 1, gear 5 having a conical recess eccentric to shafts 1 and 4, a thrust collar 10 on shaft 1 for gear 5, a clutch member 6 movable longitudinally of shaft 4, said clutch member 6 having a conical projection or boss 7 eccentric to shafts 1 and 4, and adapted to clutch shaft 4 to shaft 1 through gear 5, a gear 11 fixed on shaft 4, three further shafts 12, 13, and 14 arranged parallel to shafts 1, 2, a gear 15 loosely mounted on shaft 12, said gear 15 meshing with the gear 3 on shaft 1, a thrust collar on shaft 12 for gear 15, a further gear 19 loosely mounted on shaft 12, said further gear meshing with gear 5 on shaft 1, a thrust collar 32 on shaft 12 for gear 19, gears 15 and 19 having conical opposing recesses 16, 22 eccentric to shaft 12, a clutch member movable longitudinally on shaft 12 and between gears 15 and 19, said clutch member 17 having conical projections or bosses 20, 21 eccentric to shaft 12 and adapted to clutch either of gears 15, 19 to shaft 12, a further gear 23 fixed on shaft 12, said gear 23 meshing with the gear 11 on shaft 4, a gear 24 loosely mounted on shaft 13, said gear 24 meshing with gear 3 on shaft 1, a thrust collar on shaft 13 for gear 24, the gear 24 having a conical recess 25 eccentric to shaft 13, a clutch member 26 movable longitudinally on shaft 13, said clutch member having a conical projection or boss 28 eccentric to shaft 13 and adapted to clutch gear 24 to shaft 13, a further gear 29 fixed on shaft 13, a gear 30 on idler shaft 14, said gear 30 meshing with gear 29 on shaft 13 and gear 11 on shaft 4, as set forth.

In testimony whereof I have signed my name to this specification in the presence of two subscribing witnesses.

HARRY EDGAR LEVER.

Witnesses:
 CHAS. OVENDALE,
 W. S. AVES.